Nov. 23, 1954  H. J. HANAUER  2,694,866
LEVEL
Filed Aug. 14, 1953
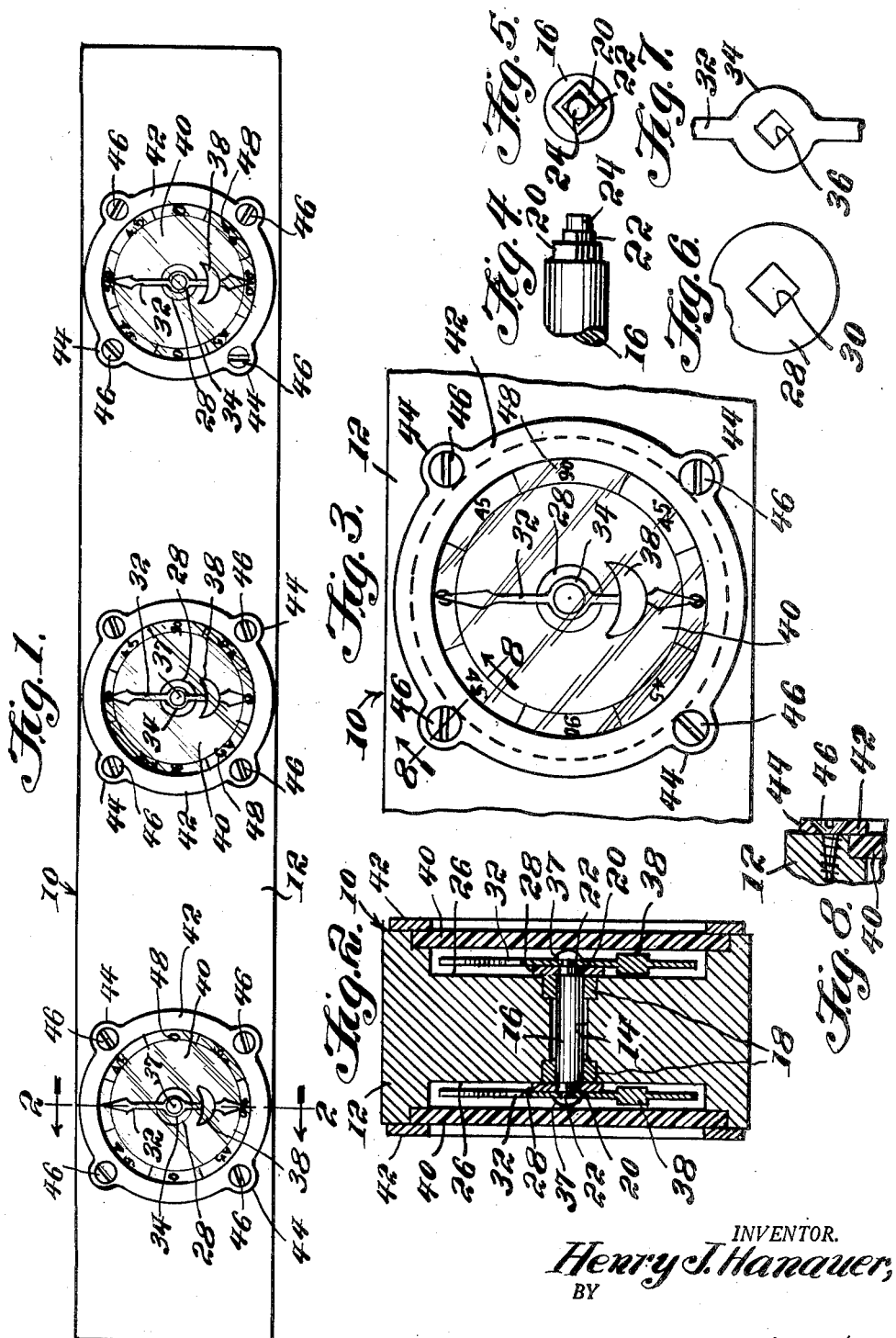
INVENTOR.
Henry J. Hanauer,
BY
McMorrow, Berman + Davidson
ATTORNEYS United States Patent Office 2,694,866
Patented Nov. 23, 1954

2,694,866

LEVEL

Henry J. Hanauer, Shelton, Conn.

Application August 14, 1953, Serial No. 374,231

1 Claim. (Cl. 33—215.1)

This invention relates to levels, such as those used in various trades, such as the carpentry, machinists, and masons trades, by the artisans employed in said trades. More particularly, the invention has reference to a level of the general type referred to which will be without fluid, and which will indicate the degree of inclination of the level body through the medium of one or more weighted index arms.

It is recognized that heretofore, it has been proposed to provide a level of the type referred to with a weighted index arm, adapted to traverse a degree-marked scale. No attempt is being made herein to claim such an invention broadly, accordingly, and it is proposed, rather, to provide a device as stated which will be generally improved over other similar devices which have heretofore been devised.

Another object of importance is to provide a level of the nature described which will be of simplified design, as compared to approximately similar devices heretofore conceived.

Another object is to provide a level of the type stated wherein an improved bearing means will be provided for a transverse shaft extending through the body of the level, which bearing means will be particularly designed to insure free rotation of the shaft with friction being reduced to a minimum during said free rotation.

Another object is to provide, in association with a shaft as described, a pair of index arms, said index arms being secured to each end of the shaft for rotation conjointly with the shaft, the respective index arms overlying the opposite surfaces of the level body, thereby to permit a reading to be taken from either side of the body without danger of said reading differing from that which would be provided at the opposite sides.

Another object is to provide, at the location of the connection between the index arm and the adjacent end of the shaft, a shaft formation wherein the shaft will have a reduced axial extension having contiguous portions of non-circular cross section, said portions being of different cross sectional areas, with one portion being adapted to receive the index arm and the other portion being adapted to receive a spacer washer, the spacer washer engaging against an adjacent bushing in which the shaft end is rotatable, the construction being designed to insure the free rotation of the shaft and its associated index arm and washer, in a manner that will effectively eliminate the possibility of the shaft accidentally contacting an adjacent surface of the body.

Still another object is to provide a device of the type stated wherein the shaft will be protectively housed within a hollow recess formed in the level body, said recess being covered over by a transparent disc such as a disc of clear plastic, the disc being in turn held in proper position against the body through the medium of a retaining ring secured by screws or equivalent fastening elements at circumferentially spaced locations, directly to the body of the level.

Other objects will appear from the following description, the claim appended thereto, and from the annexed drawing, in which like reference characters designate like parts throughout the several views, and wherein:

Figure 1 is a side elevational view of a level formed in accordance with the present invention;

Figure 2 is an enlarged transverse sectional view through the level, taken substantially on line 2—2 of Figure 1;

Figure 3 is an enlarged, fragmentary side elevational view of the level showing one of the indicator assemblies;

Figure 4 is an enlarged, fragmentary elevational view showing one end portion of one of the indicator arm support shafts;

Figure 5 is an end elevational view of said shaft;

Figure 6 is an elevational view of one of the spacer washers;

Figure 7 is a fragmentary elevational view of one of the index arms or indicators, the end portions of said arm being broken away due to space limitations in the drawing; and Figure 8 is a fragmentary, detail sectional view taken substantially on line 8—8 of Figure 3, showing the connection of the retainer ring to the level body.

The reference numeral 10 has been applied generally in the drawing to designate the level constituting the present invention. The level can, of course, be of any desired length or transverse dimensions, and in the illustrated example, has three indicator arm assemblies, spaced equal distances apart longitudinally of the level. It will be understood, at this point, that this showing is provided purely by way of example, and the level can have a single indicator assembly, or more than three assemblies, the number of said assemblies being immaterial.

In any event, the level body 12 can be solidly formed, from wood material or the like, or alternatively, can be cast or extruded from metal material such as aluminum, it being mainly important that any metal used in constructing the level or any part thereof be non-magnetic in respect to the characteristics thereof.

The level body 12 is formed with a transverse bore 14 (Figure 2), in which is rotatable a transversely extending shaft 16. The end portions of the shaft 16 are rotatably engaged in bushings 18, said bushings providing bearings for the shaft, whereby the shaft is spaced inwardly from the wall of the bore 14. In this way, the bearing area of the shaft 16 is held to a minimum, it being understood that the end portions of the shaft would be freely rotatable within the bushings 18 associated therewith, thereby to insure that the shaft will rotate with a minimum amount of friction.

It is believed worthy of note, at this point in the description, that although a single indicator assembly will be hereinafter described, the description of said assembly is intended to apply to the other assemblies shown, all of said indicator assemblies being substantially identical to one another.

In any event, the shaft 16, at each of its ends, has an axial extension projecting beyond the bushing 18 adjacent thereto. The axial extension has an inner end portion 20 of non-circular cross section, an intermediate portion 22 also of non-circular cross section, and an outer end portion 24 which is initially of circular cross section. The inner end portion 20 is reduced in diameter relative to the main diameter of the shaft, but is nevertheless substantially greater in cross sectional area than the non-circular portion 22. Similarly, the non-circular portion 22 is substantially greater in cross sectional area than the circular portion 24. The cross sectional size of the shaft is thus progressively stepped down in the direction of each end of the shaft. It may be noted that the portions of non-circular cross section can be square in cross section as shown, or can alternatively be of some other type of non-circular cross section, such as triangular or oval.

The stepped axial extensions of the shaft are disposed centrally within shallow, circular recesses 26 formed in the opposite side surfaces of the level body, said recesses being in concentric relation to the freely rotatable shaft 16. The depressions or recesses 26 are adapted to contain the index arms, and to space the index arms away from the inner walls of the recesses, spacer washers 28 (Figure 6) are provided. The spacer washers 28 are of substantial diameter, each washer 28 having a non-circular center opening 30 receiving the portion 20 of the shaft. The washers 28 abut against the outer sufaces of the bushings 18 adjacent thereto, and are spaced outwardly from the inner surfaces of the recesses 26 to a slight extent, by said bushings 18.

The index arms have been designated by the reference numeral 32, each index arm being formed from non-magnetic material and having a widened mid-length part 34 formed with a non-circular center opening 36 receiving the portion 22 of the shaft. The index arms, intermediate their ends, abut against the outer surfaces of the washers 28, and are spaced outwardly from the inner walls of the recesses by said washers.

After the index arms have been applied to the shaft ends, the outer portions 24 of the shaft extensions are peened over as at 37 (Figure 2). In this way, the index arms at the opposite ends of each shaft are permanently secured to their associated shaft for rotation conjointly with the shaft and with one another. A true reading can be taken at each side of the level as a result of this construction, and it will be apparent that there is no possibility of said reading differing from one side of the level body to the other. This is of importance, since it permits a piece of work to be leveled transversely thereof at the same time that said work is being leveled or located at a selected angle of inclination when considered in the direction of its length.

Integrally or otherwise fixedly secured to each index arm is a weight 38, said weight 38 being of crescent shape in the illustrated example and being arranged transversely of the index arm. The weight 38 insures that the arm will be disposed in a vertical position at all times, regardless of the inclination of the level body.

Covering each recess 26 is a flat disc 40 of transparent material, such as plastic. The disc 40 is somewhat greater in diameter than the recess 26, the recess 26 being counterbored to receive the peripheral portion of the associated cover disc. The outer surface of the cover disc is flush with the adjacent surface of the level body (see Figure 2), and holding the disc in place is a retaining ring 42. The retaining ring 42 is formed from a flat piece of metal material having an annular shape, said retaining ring being provided integrally, at equidistantly spaced locations taken circumferentially thereof, with outwardly extending ears 44 apertured for extension therethrough of fastening screws 46. The screws 46 (Figure 8) are threaded into the level body, thus to fixedly mount the cover discs in position within the recesses.

The cover discs 40 can be provided with circular, degree-marked scales 48, said scales being traversed by the pointed ends of the respective index arms. The scale can be varied as desired, and in the illustrated example the center scale has a "zero" reading registering with the ends of the indicator arms when the level body is horizontal, the end assemblies having scales provided with "ninety degree" readings registering with the ends of the index arm in said horizontal position of the level body. Other arrangements can be provided, as desired, the illustrated construction being shown purely as representative of one which will be particularly adapted to facilitate use of the level both for determining horizontality and verticality of a piece of work to which it is applied.

It will be noted from Figure 2 that the weight 38 of each arm is relatively thickened relative to the body portion, that is, the remainder, of the arm. Each weight, in this connection, is thus caused to project laterally out of the plane of the body portion, in the direction of the floor of the recess 26. The washer 28 is of a thickness slightly greater than the thickness of the laterally projecting portion of the weight, thus spacing the weight away from the floor of the recess. The washer, of course, rotates with the shaft and index arm, and engages against the outer end of the adjacent bushing 18. Bushing 18, by being mounted in a counterbore of the shaft-receiving bore 14, can thus be caused to project to a minute extent beyond the bottom of recess 26, to hold the washer 28 out of engagement with said recess bottom. Therefore, the washer, while serving as a spacer holding the weight away from the floor of the recess, is in frictional engagement with adjacent portions of the device to a minimum extent, said washer abutting against the bushing 18 as specified hereinbefore and being spaced downwardly from the inner surface of the recess to a slight extent by the bushing, also as hereinbefore noted. This arrangement is specifically intended to reduce to a minimum the amount of friction during rotation of the shaft, this being extremely important when a weighted index arm is incorporated in a level. Any appreciable friction affects, even minutely, the disposition of the arm at exact verticality in various positions to which the level may be inclined.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claim.

What is claimed is:

A level comprising a body having parallel, flat side surfaces, said body having a transverse bore formed at its ends with counterbores opening upon said side surfaces, the side surfaces having recesses at the location of the bore ends; bushings mounted in the counterbores adjacent the recesses; a shaft extending within the bore and having its end portions rotatably engaged within the bushings, said shaft having reduced, axial extensions formed thereupon, said extensions being disposed within the recesses of the side surfaces of the body, each extension having contiguous portions of non-circular cross section with one of said portions being substantially smaller in cross sectional area than the other portion; a washer mounted upon the larger non-circular portion of each extension and abutting against the adjacent bushing, said washer having a non-circular center opening receiving said larger non-circular portion; and an index arm including a planiform body portion having a non-circular opening receiving the smaller non-circular portion of each extension, said index arm abutting against the washer and including a weight formed upon the body portion adjacent one end of the body portion, each side surface of the body having a scale traversed by the index arm of said side surface, to provide a reading in each position to which the body is shifted during use of the level, said weight being greater in thickness than the body portion and having a portion projecting laterally out of the plane of the body portion in a direction toward the bottom wall of the recess, the washer being greater in thickness than said projecting portion of the weight to space the weight away from said bottom wall, said bushings projecting out of their associated counterbores to a slight extent to space their associated washers out of engagement with said bottom walls of the recesses.

References Cited in the file of this patent

UNITED STATES PATENTS

| Number | Name | Date |
|---|---|---|
| 955,799 | Holbrook | Apr. 19, 1910 |
| 1,295,352 | Masher | Feb. 25, 1919 |
| 1,618,262 | Barger | Feb. 22, 1927 |
| 1,946,072 | Horlacher | Feb. 6, 1934 |

FOREIGN PATENTS

| Number | Country | Date |
|---|---|---|
| 53,858 | Switzerland | Oct. 20, 1910 |